(12) United States Patent
Welland

(10) Patent No.: US 7,720,176 B2
(45) Date of Patent: May 18, 2010

(54) EDGE TRANSCEIVER ARCHITECTURE AND RELATED METHODS

(75) Inventor: David Welland, Austin, TX (US)

(73) Assignee: ST-Ericsson SA, Geneva (CH)

( * ) Notice: Subject to any disclaimer, the term of this patent is extended or adjusted under 35 U.S.C. 154(b) by 895 days.

(21) Appl. No.: 11/510,339

(22) Filed: Aug. 25, 2006

(65) Prior Publication Data

US 2007/0071129 A1    Mar. 29, 2007

Related U.S. Application Data

(60) Provisional application No. 60/720,413, filed on Sep. 26, 2005.

(51) Int. Cl.
*H04L 27/12* (2006.01)
(52) U.S. Cl. ...................................... 375/302
(58) Field of Classification Search ................ 375/302, 375/305, 308; 332/100, 119, 145, 151; 455/61, 455/102–104
See application file for complete search history.

(56) References Cited

U.S. PATENT DOCUMENTS

| | | | |
|---|---|---|---|
| 4,700,327 A | 10/1987 | Hilton | |
| 6,369,666 B1 * | 4/2002 | Simon et al. | ................ 332/100 |
| 6,563,383 B1 | 5/2003 | Otaka et al. | |
| 6,711,391 B1 | 3/2004 | Walker et al. | |
| 6,747,987 B1 | 6/2004 | Meador | |
| 6,812,771 B1 | 11/2004 | Behel et al. | |
| 7,065,327 B1 | 6/2006 | Macnally et al. | |
| 7,394,862 B2 * | 7/2008 | Jensen et al. | ................ 375/272 |
| 7,444,124 B1 | 10/2008 | Loeb et al. | |
| 7,421,259 B2 | 11/2008 | Gomez et al. | |
| 7,542,741 B2 | 6/2009 | Rozenblit et al. | |
| 2002/0039047 A1 | 4/2002 | Suzuki | |
| 2002/0135423 A1 | 9/2002 | Yamashita | |
| 2004/0152437 A1 | 8/2004 | Behzad | |
| 2004/0185810 A1 | 9/2004 | Kishi | |
| 2005/0054308 A1 | 3/2005 | Vayrynen | |
| 2005/0059373 A1 | 3/2005 | Nakamura et al. | |
| 2005/0107054 A1 | 5/2005 | Nakayama | |
| 2005/0153671 A1 | 7/2005 | Ichikawa | |

(Continued)

FOREIGN PATENT DOCUMENTS

CN    101273533 A    11/2008

(Continued)

OTHER PUBLICATIONS

Silicon Laboratories, "Aero™ II GSM/GPRS Transceiver," Jun. 2004, pp. 1-2.

(Continued)

*Primary Examiner*—Don N Vo
(74) *Attorney, Agent, or Firm*—William J. Kubida; Michael C. Martensen; Hogan & Hartson LLP

(57) ABSTRACT

In one embodiment, the present invention includes an apparatus having multiple transmission paths, including a first transmission path configured to receive and process baseband data in a first mode of operation to generate a radio frequency (RF) signal for output via a common output path, and a second transmission path configured to receive and process the baseband data in a second mode of operation to generate the RF signal for output via the common output path.

26 Claims, 4 Drawing Sheets

U.S. PATENT DOCUMENTS

| | | |
|---|---|---|
| 2005/0260956 A1 | 11/2005 | Loraine et al. |
| 2005/0270098 A1 | 12/2005 | Zhang et al. |
| 2006/0058074 A1 | 3/2006 | Tsividis |
| 2006/0072684 A1* | 4/2006 | Feher .................. 375/308 |
| 2006/0160506 A1 | 7/2006 | Smentek et al. |
| 2006/0214842 A1 | 9/2006 | Takenoshita et al. |
| 2006/0244530 A1 | 11/2006 | Kocaman et al. |
| 2007/0087710 A1 | 4/2007 | Chou et al. |
| 2007/0111685 A1 | 5/2007 | Paul et al. |

FOREIGN PATENT DOCUMENTS

| | | |
|---|---|---|
| DE | 10209516 A1 | 7/2003 |
| EP | 1102392 A2 | 5/2001 |
| EP | 1341300 A1 | 9/2003 |
| GB | 2389251 A | 12/2003 |
| WO | 03/036896 A2 | 5/2003 |
| WO | 03088511 A | 10/2003 |
| WO | 2004/021659 A | 3/2004 |
| WO | 2005/088922 A | 9/2005 |
| WO | 2007037963 A1 | 4/2007 |

OTHER PUBLICATIONS

Silicon Laboratories, "Aero® IIe Transceiver," Sep. 2005, pp. 1-2.

Silicon Laboratories, "Aero IIe Transceiver for GSM, GPRS, and EDGE," Sep. 16, 2005, pp. 1-2.

Patrick Morgan, Ph.D., "Highly Integrated Transceiver Enables High-Volume Production of GSM/EDGE Handsets," Jul. 2006, pp. 1-4.

U.S. Appl. No. 11/394,249, filed Mar. 30, 2006, entitled, "Digital Variable Gain Mixer," by Srinath Sridharan, Ahmed Emira, Aria Eshraghi, and David Welland.

Silicon Laboratories, "Si4212: Aero IIe Transceiver for GSM, GPRS, and EDGE," Sep. 16, 2005, p. 1-2.

* cited by examiner

EDGE TRANSCEIVER ARCHITECTURE AND RELATED METHODS

This application claims priority to U.S. Provisional Patent Application No. 60/720,413 filed on Sep. 26, 2005 in the name of David Welland, Patrick Morgan, Srinath Sridharan, Sheng-Ming Shan, Ahmed Emira, Aria Eshraghi, and Donald Kerth entitled EDGE TRANSCEIVER ARCHITECTURE AND RELATED METHODS.

FIELD OF THE INVENTION

Embodiments of the present invention relate to wireless communication and more particularly to transceiver circuitry for use in such communication.

BACKGROUND

Transceivers are used in many communication systems including wireless devices, for example. A transceiver can be used for both transmit and receive operations in a device. Often, a transceiver is coupled between a baseband processor and an antenna and related circuitry of a system. In the receive direction, incoming radio frequency (RF) signals are received by the transceiver, which downconverts them to a lower frequency for processing by the baseband processor. In the transmit direction, incoming baseband data is provided to the transceiver, which processes the data and upconverts it to a higher frequency, e.g., a RF frequency. The upconverted RF signals are then passed to a power amplifier (PA) for amplification and transmission via an antenna.

Thus the transceiver acts as an interface between baseband and RF domains. Among the various tasks performed by a transceiver are downconversion and upconversion, modulation and demodulation, and other related tasks. Oftentimes, a transceiver is controlled by a baseband processor to which it is coupled. In turn, the transceiver is coupled to a power amplifier, which generates appropriately conditioned RF signals for transmission via an antenna. In the transmit direction, the transceiver provides RF signals to the power amplifier, which amplifies the signals based on gain and ramp information for a given modulation type. Different wireless communication protocols implement different modulation schemes. For example, a Global System for Mobile communication (GSM) system can implement various modulation schemes, including a gaussian minimum shift keying (GMSK) modulation scheme for voice/data. Furthermore, extensions to GSM, such as Enhanced Data rates for GSM Evolution (EDGE) use other modulation schemes, such as an 8 phase shift keying (8-PSK) modulation scheme, in addition to GMSK modulation.

Some PAs in certain wireless protocols operate in a linear mode. Other PAs can operate in a saturated mode. GMSK schemes typically transmit in a saturated mode in which transmitted data is output from the PA with a constant amplitude as measured by power versus time during the useful part of the burst. In contrast, 8-PSK modulation typically requires a linear mode in which a time-varying amplitude is output from the PA as measured by power versus time during the useful part of the burst. However, certain radio architectures including EDGE functionality attempt to use a saturated mode PA for 8-PSK modulation. A technique generally called polar modulation is typically used in these architectures. Polar modulation architectures include separate amplitude and phase/frequency pathways. A variant of polar modulation called polar loop exists in which the separate amplitude and phase/frequency pathways somehow exist as part of a feedback loop. Such polar loop architectures can have stability challenges. In both cases (polar modulation and polar loop), the amplitude pathway contains circuitry whose delay must be matched very closely to the delay through the phase pathway to avoid serious performance degradation. In a production environment, delays should be matched over all variations in process, supply voltage, frequency, output power, and temperature, creating a fundamentally difficult design and manufacturing challenges. As the transfer function of the PA changes over the range of output powers, the polar loop, by virtue of its feedback loop, may become unstable, causing damage to the PA or causing a handset to drop a call. External loop filters complicate calibration by allowing unwanted parasitic coupling to the printed circuit board (PCB) of the handset, PA, and other sources of interference and noise.

The Third Generation Partnership Project (3GPP) specification for compliant second and third generation (3G) mobile stations requires a maximum spectral power density of −54 dBc for 8-PSK at a frequency offset of 400 kHz. Handset manufacturers typically require that no more than −60 dBc be produced from the transceiver. With a delay mismatch of approximately 30 ns the spectrum becomes marginally failing to this specification. Accordingly, challenges exist in implementing 8-PSK features in polar architectures, and a need exists for more suitable radio architectures.

SUMMARY OF THE INVENTION

In one aspect, the present invention includes an apparatus having multiple transmission paths. More particularly, a first transmission path may be configured to receive and process baseband data in a first mode of operation to generate a RF signal for output via a common output path. A second transmission path may be configured to receive and process the baseband data in a second mode of operation to generate the RF signal for output via the common output path. As one example, the different modes of operation may correspond to GMSK and 8-PSK modes. Some embodiments may be implemented in an apparatus in which at least a portion of the first transmission path is reusable in the second mode of operation to provide an unmodulated carrier signal to the second transmission path.

In various embodiments, the first transmission path may include an offset phase lock loop (OPLL) that has a phase detector that is coupled to receive an output of a first mixer and a feedback signal from a second mixer. The OPLL may further include a filter to receive and filter the output of the phase detector, and a local oscillator coupled to an output of the filter to output a modulated signal in the first mode of operation and to output an unmodulated signal in the second mode of operation.

Yet another aspect of the present invention is directed to a system that includes multiple transmission paths, at least one of which is coupled to a power amplifier. More specifically, a first transmitter path is configured to receive first baseband data and generate a GMSK RF signal in a GMSK mode of operation, while a second transmitter path is configured to receive second baseband data and generate an 8-PSK RF signal in an 8-PSK mode of operation. The second transmitter path may receive an unmodulated carrier signal from the first transmitter path during the 8-PSK mode of operation, and may further operate to buffer the GMSK RF signal in the GMSK mode of operation. The first transmitter path may include an OPLL, while the second transmitter path may include an analog amplifier coupled to receive the second baseband data, a filter coupled to an output of the analog amplifier, and a mixer coupled to an output of the filter to mix the second baseband data with the unmodulated carrier signal from the first transmitter path in the 8-PSK mode of operation.

A still further aspect of the present invention is directed to a method in which first incoming baseband signals are provided to a first transmission path of a transceiver and second incoming baseband signals are provided to a second transmission path of the transceiver. The first incoming baseband signals are of a first wireless communication protocol, and the second incoming baseband signals are of a second wireless communication protocol. The first incoming baseband signals may be processed in an OPLL of the first transmission path to obtain first RF signals, while second RF signals may be generated in the second transmission path via modulation of an unmodulated output signal of the OPLL with the second incoming baseband signals.

Embodiments of the present invention may be implemented in appropriate hardware, firmware, and software. To that end, one embodiment may be implemented in a system for wireless transmission. Still other embodiments may include a system including an integrated circuit such as a transceiver along with additional components.

DETAILED DESCRIPTION

A transceiver in accordance with an embodiment of the present invention may be used in handsets accommodating multi-mode wireless communications. For example, a transceiver in accordance with an embodiment may be used in a GSM system to provide support for various communication protocols including GPRS and EDGE communication schemes. Accordingly, the transceiver may support both GMSK and 8-PSK modulation schemes.

To this end, a transceiver in accordance with an embodiment of the present invention may include multiple transmission paths to support the various modulation schemes and provide for communication according to multiple protocols. Furthermore, to enable reduced size and power consumption, portions of the transmission paths may be reused in both schemes to reduce needed circuitry in a transceiver design. Still further, in various embodiments, the circuitry of the various transmission paths may include low noise circuitry to enable communication according to multiple schemes without degrading performance of any of the communication protocols, as well as avoiding leakage that causes interference in the airwaves at a frequency of closely located handsets' receive bands.

Various amounts of circuitry may be reused for the different modulation schemes of multiple protocols. For example, in some embodiments an offset phase-locked loop (OPLL) of a first transmission path may be reused in multiple modes of operation. The OPLL may be modulated by incoming baseband data (e.g., complex in-phase and quadrature (I/Q) signals) in a GMSK mode. Such OPLL circuitry may be reused as a local oscillator (LO) in an 8-PSK mode of operation. In this way, the minimal noise features of an OPLL may aid in improved signal-to-noise ratio (SNR) performance in both GMSK and 8-PSK modes of operation. In many implementations, unlike conventional linear transmitter architectures, no transmit surface acoustic wave (SAW) filter may be needed. Additional circuitry, e.g., of a second transmission path may also be reused in the different modes of operation. For example, a mixer and digital variable gain amplifier (DVGA) of the second transmission path may be used in two modes. In an 8-PSK mode of operation, the mixer/DVGA operates to upconvert incoming baseband signals to a desired transmit frequency. The mixer may further operate in a GMSK mode in which the mixer substantially acts as a buffer for modulated signals received from the OPLL. In this mode of operation, the mixer may provide a fixed output power level corresponding to a desired saturation level for the GMSK mode of operation.

Figure 1:
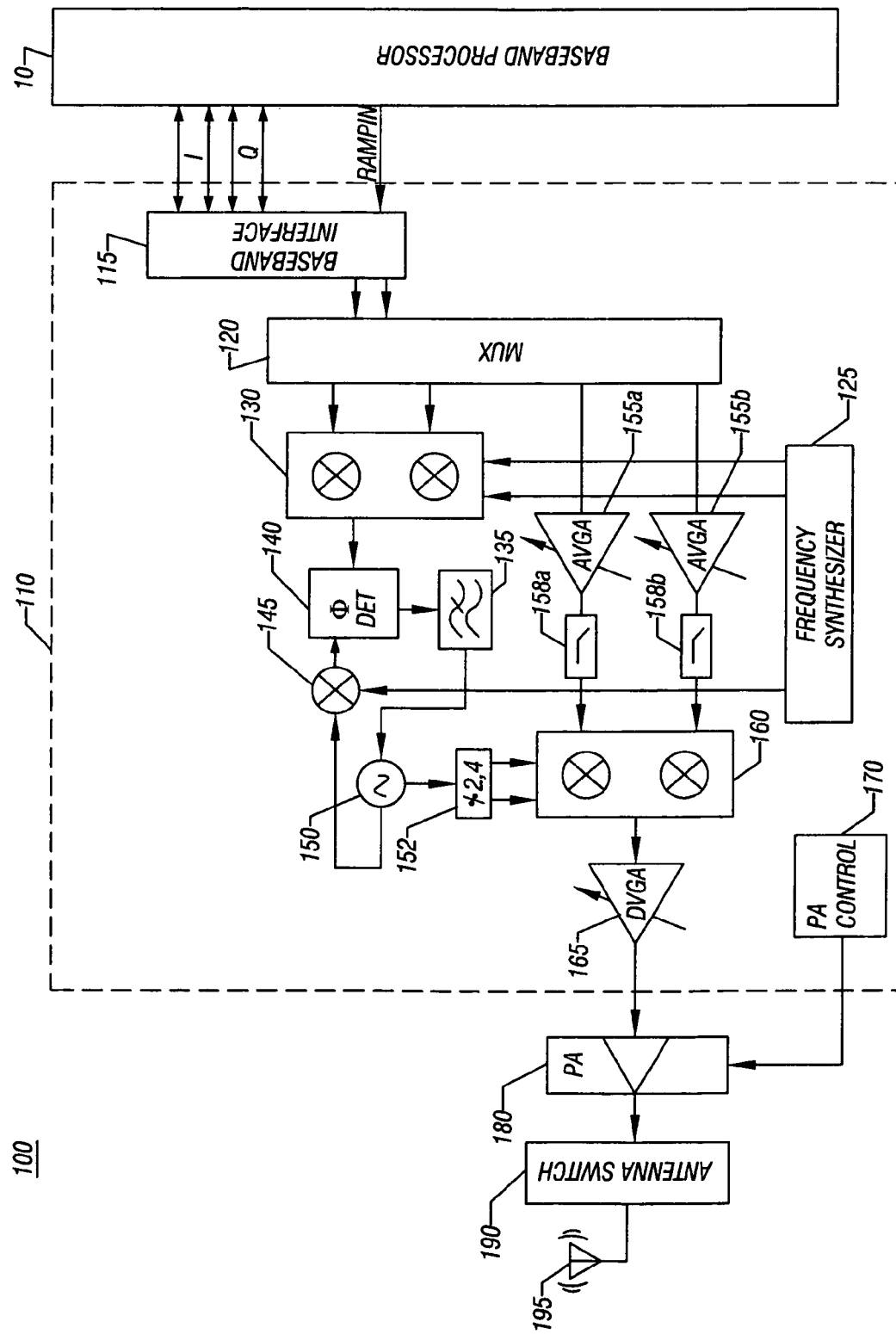
FIG. 1 is a block diagram of a transceiver in accordance with an embodiment of the present invention.

Referring now to FIG. 1, shown is a block diagram of a transceiver in accordance with an embodiment of the present invention. As shown in FIG. 1, a transceiver 110 may be implemented in a system 100 such as a wireless device, e.g., a cellular telephone handset, personal digital assistant (PDA) or other such device. Transceiver 110 may include both receive and transmit circuitry, although the transmit circuitry only is shown in the embodiment of FIG. 1 for ease of illustration. As shown in FIG. 1, transceiver 110 is coupled to a baseband processor 10. Accordingly, baseband communication may occur between transceiver 110 and baseband processor 10. Transceiver 110 is further coupled to a power amplifier (PA) 180, which in turn is coupled to an antenna switch 190 that itself is coupled to an antenna 195. In accordance with an embodiment of the present invention transceiver 110 may be adapted in a single integrated circuit (IC) transceiver that includes both receive and transmit paths and various control circuitry therefor, in one embodiment. Further still, in some embodiments the transmit path may be a direct upconversion transmitter.

Still referring to FIG. 1, transceiver 110 includes various circuitry to enable receipt of baseband signals from baseband processor 10 and processing thereof to provide RF outputs to PA 180. Accordingly, transceiver 110 includes a baseband interface 115 to provide coupling to baseband processor 10. Baseband interface 115 in turn is coupled to a multiplexer 120, which is controlled to provide outputs to different paths depending on the mode of operation (e.g., GMSK mode or 8-PSK mode). As shown in FIG. 1, baseband interface 115 is coupled in a bidirectional manner with baseband processor 10 to enable transmission and receipt of baseband I and Q signals, as well as the receipt of incoming control signals (e.g., a RAMPIN signal) from baseband processor 10. Of course, additional control signals for controlling operation of transceiver 110 may further be received from baseband processor 10. As one example, baseband processor 10 may provide control signals which may pass through transceiver 110 to control PA 180. Note that the incoming ramp signal from baseband processor 10 may be an analog signal generated by a ramp digital-to-analog converter (DAC) in baseband processor 10. To provide for use of transceiver 110 with various baseband processors and power amplifiers, circuitry to provide for different manners of passing the ramp value to an associated PA may be implemented, as will be discussed below.

In various implementations, multiplexer 120 may provide incoming baseband signals to a selected one of multiple transmission paths. Thus the embodiment of FIG. 1 shows a dual transmitter design in which different transmit paths are present. These different paths may be controlled differently in different modes of operation. For example, in a GMSK mode, incoming I/Q signals are provided to a first transmission path including the OPLL, while in an 8-PSK mode, incoming I/Q signals are provided to a second transmission path including the mixer/DVGA, as discussed above.

In GMSK mode, I and Q data is provided to the first transmission path that includes a mixer 130 which may be an intermediate frequency (IF) mixer running at a frequency of approximately 500 MHz, which is controlled to mix the incoming signals with a frequency provided by a frequency synthesizer 125. The signals from frequency synthesizer 125 provided to mixer 130 are used to upconvert the incoming baseband I and Q signals to a desired intermediate frequency. In various implementations, the IF signals provided from frequency synthesizer 125 to mixer 130 may be set at a fixed value. For purposes of discussions herein, such signals may be provided at a fixed frequency D. Accordingly, the output of mixer 130 provides modulated signals at this intermediate frequency D.

As shown in FIG. 1, the OPLL may include a phase detector 140, which is coupled to receive the upconverted modulated signals from mixer 130. As further shown in FIG. 1, phase detector 140 is further coupled to receive an output from a mixer 145. Mixer 145 in turn is controlled via another output from frequency synthesizer 125. For purposes of discussion herein, this output may be at a frequency C. In various embodiments, C may be controllable to vary the input to mixer 145 via the action of feedback. For purposes of discussions herein, the output of mixer 145 may be at a frequency B.

Feedback will operate to equalize the frequency inputs to phase detector 140. That is, phase detector 140 in conjunction with the other components of the OPLL will drive B to equal D. In other words, the OPLL will operate according to a first loop equation where:

$$B=D \quad [1].$$

In turn, the output of phase detector 140 is provided to a filter 135. The filtered output is fed to a local oscillator (LO) 150 that is coupled in a feedback loop with mixer 145. The output (B) of mixer 145 equals the sum/difference of the inputs thereto, namely the output of LO 150, A, and the output of frequency synthesizer 125, C. Thus a second loop equation corresponds to:

$$B=A\pm C \quad [2].$$

These two equations can be combined to obtain the output A (for purposes of discussion) of LO 150. Specifically:

$$A=D\pm C \quad [3].$$

Accordingly, by controlling frequency C from frequency synthesizer 125, the output of LO 150, i.e., A, is a modulated signal generated at a desired frequency A, which is output to a divider/quadrature phase shifter 152 which provides complex signals to a mixer 160 of the second transmission path. Divider/shifter 152 may be configured, for example, as a divide by 2 or divide by 4, in various implementations, or other integers.

The OPLL is a suitable design for use in various applications such as a GMSK modulation scheme since the OPLL can generate signals with very low noise. This low noise in part is due to the presence of filter 135, which filters noise generated in various noisy components of the first path, including phase detector 140 and mixer 130, as well as other noise inherent in the circuit. Given the stringent noise requirements for GSM, use of the OPLL provides for suitable SNRs, preventing noise from leaking into the GSM receive bands of other handsets. Furthermore, the reduced noise effects using the OPLL allow a design that consumes less power and chip area. Still further, the need for an off-chip SAW filter may be avoided. That is, because the OPLL provides a signal with lower noise, inclusion of a SAW filter in a system can be averted. Filter 135 thus allows modulated signals to pass to LO 150 in GMSK mode, while preventing noise from front-end components of transceiver 110 from being passed.

A mixer 160 and DVGA 165 of the second transmission path may form a digital variable gain mixer. That is, while shown as separate components in the embodiment of FIG. 1, mixer 160 and DVGA 165 may be implemented with unified circuitry, in some embodiments. Note that a single mixer and DVGA is shown for ease of illustration in the embodiment of FIG. 1. However, it is to be understood that in many implementations multiple mixers and DVGAs may be present to provide outputs at different frequency bands (e.g., 900 MHz and 1800 MHz). Further, such different DVGAs may be independently gain-controlled for different power levels for a given frequency band.

In GMSK mode of operation, at least portions of mixer 160 may be powered down and a single incoming current from the baseband path of the second transmission path may act as a DC current, with an incoming signal from LO 150 of the first transmission path providing the signal modulation. Thus in GMSK mode, modulated I/Q signals provided from LO 150 are provided to mixer 160, which substantially acts as a buffer to mix the modulated signals with a DC baseband current (which may be a single baseband path), and provide an output to DVGA 165.

The signals amplified in DVGA 165 are thus provided out of transceiver 110. Transceiver 110 may be coupled to a PA 180 that receives the RF signals from transceiver 110. Furthermore, as shown in FIG. 1, PA 180 may be controlled via signals received from transceiver 110. In various embodiments, transceiver 110 further includes a power amplifier controller 170 to control PA 180. However, depending on a system in which transceiver 110 is adapted, control of PA 180 may come from the baseband processor 10 or in another desired manner.

Referring still to FIG. 1, the second transmission path of transceiver 110 enables transmission of signals of a different mode of operation than the first transmission path. Specifically, as shown in FIG. 1, the second transmission path is coupled to receive I and Q data from multiplexer 120 at a pair of analog variable gain amplifiers/attenuators (AVGAs) 155*a* and 155*b* (generically AVGA 155). A gain level (which may be an attenuation level) of AVGA 155 may be controlled with an analog or continuous signal. The output signals from these amplifiers/attenuators may be filtered in respective low pass filters (LPFs) 158*a* and 158*b* (generically LPF 158). Filters 158 may be LPFs because these signals are in the transmission path at baseband frequencies. Note that AVGAs 155*a* and 155*b* may be controlled by ramp signals received from baseband processor 10. In various embodiments, ramp signals alternatively may be provided from baseband processor 10 directly to PA 180. Accordingly, to enable use of transceiver 110 with chips of various manufacturers, AVGAs 155*a* and 155b may be variably controlled to provide a desired gain/attenuation as needed for a particular system in which transceiver 110 is located.

Owing to its desirable noise characteristics, various portions of the first transmission path may be reused for 8-PSK modes. More specifically, portions of the first transmission path may be used to enable operation in an 8-PSK mode with minimal additional circuitry (i.e., AVGAs 155 and filters 158). In an 8-PSK mode, the first transmission path is used to create a constant wave (CW) carrier signal. Noise is still a concern, but the noise requirements for 8-PSK mode are slightly relaxed as compared to GMSK mode. Accordingly, a minimal amount of additional circuitry (and therefore additional noise) to implement 8-PSK transmissions may be present. In 8-PSK mode, mixer 160 receives baseband currents from the second transmission path which are mixed with an unmodulated pure carrier signal from LO 150.

In various embodiments, mixer 160 may be a commutating mixer, rather than a multiplier-based mixer. In this way, reduced noise is realized, as switches that form the mixer may be of relatively low noise. Such a commutating mixer may operate by applying square wave signals (i.e., switching on and off of switches) to an incoming baseband signal. Mixer 160 and DVGA 165 in 8-PSK mode may be digitally controlled to provide output power control of at least 40 dB and further to provide such control with a fine step, e.g., 0.5 dB per step. Mixer 160 may be implemented as a plurality of circuitry slices individually controllable to attain a desired gain level.

In some implementations, the unselected transmission path may be provided with predetermined constant values in order to provide for desired operation. For example, in the GMSK mode, the second path may be provided with full scale and zero scale signals, respectively, along the I and Q paths. In this way, the I portion of mixer 160 may be enabled such that modulated signals from the first path may be passed through DVGA 165, acting as a buffer. Similarly, in an 8-PSK mode, at least one of the mixers of complex mixer 130 may be provided with a constant full scale value so that the unmodulated frequency signal from frequency synthesizer 125 may be provided to phase detector 140 in order to generate the desired unmodulated carrier signal.

Note that while described in the embodiment of FIG. 1 as including first and second transmission paths, it is to be understood that scope the present invention is not limited in this regard. That is, in other implementations more than two separate transmission paths may be present. Furthermore, while described as separate transmission paths including circuitry that can be reused in multiple modes of operation, the architecture of FIG. 1 may also be considered to be a two-transmission path architecture with an additional common output path shared by the transmission paths. That is, at least portions of mixer 160 and DVGA 165 may be considered to be a common output path that is used in multiple modes of operation to enable transmission of RF signals processed in the first and second transmission paths. While described with this particular implementation in the embodiment of FIG. 1, it is to be understood that the scope of the present invention is not so limited and transceivers may take different forms in other embodiments.

Figure 2:
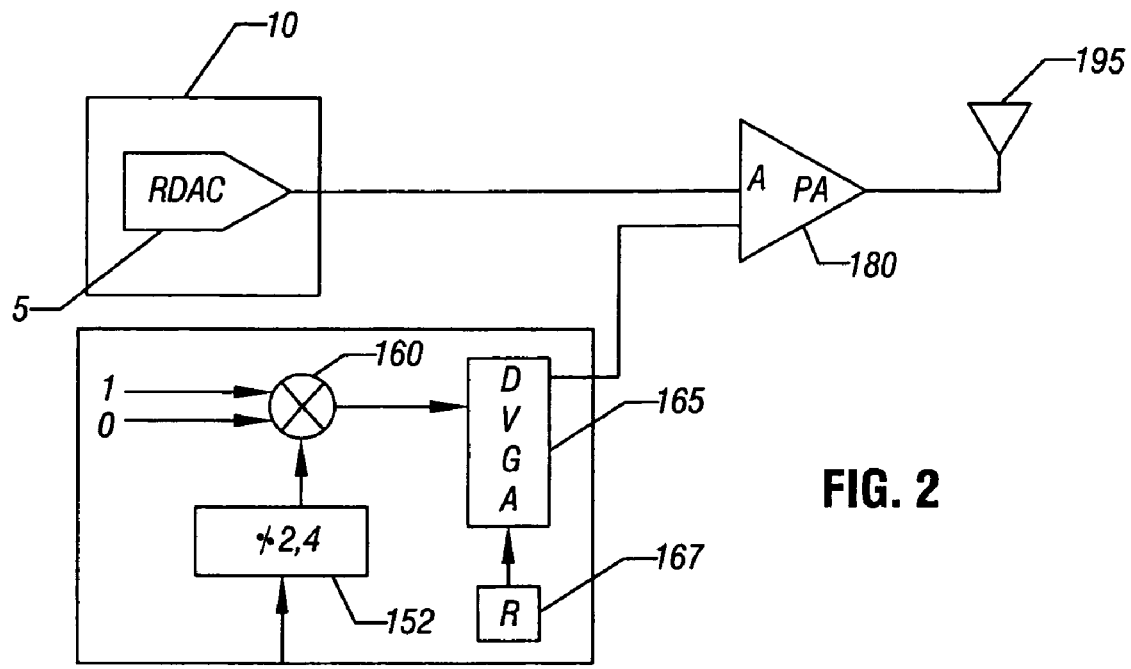
FIG. 2 is a block diagram of an open loop implementation for a GMSK mode of operation in accordance with one embodiment of the present invention.

In different implementations, a transceiver in accordance with an embodiment of the present invention may be controlled in an open loop or closed loop fashion. Referring now to FIG. 2, shown is a block diagram of an open loop implementation for a GMSK mode of operation. Note that the use of the same reference numerals in FIG. 2 as in FIG. 1 corresponds to the same components, and further note that only a few selected components of the transceiver and related components are shown for ease of illustration in FIG. 2. As shown in FIG. 2, in the open loop configuration, an analog power level signal for PA 180 may be provided directly from a baseband processor 10 and more specifically from a ramp DAC 5. This analog power level signal may be used to perform ramp activities, depending on operation requirements. At different times, the power level signal may provide ramp control for PA 180, or an active power level. As further shown in FIG. 2, transceiver 110 may be controlled to provide fixed input signals to mixer 160 (i.e., full scale and zero scale signals), e.g., from a second transmission path, while incoming modulated signals are provided to mixer 160 via phase shifter/frequency divider 152. In one embodiment, incoming modulated signals to phase shifter 152 may be provided at 4 GHz. Mixer 160 provides a modulated output to DVGA 165, which may be controlled by information in a register 167. The information may correspond to a nominal level for control of DVGA 165. The RF output from DVGA 165 is thus provided to PA 180, where the RF signal is controlled according to the analog power level signal received from baseband processor 10. Note that while shown as being directly provided from baseband processor 10 to PA 180, it is to be understood that in various implementations, the analog power level signal may be passed through transceiver 110.

Figure 3:
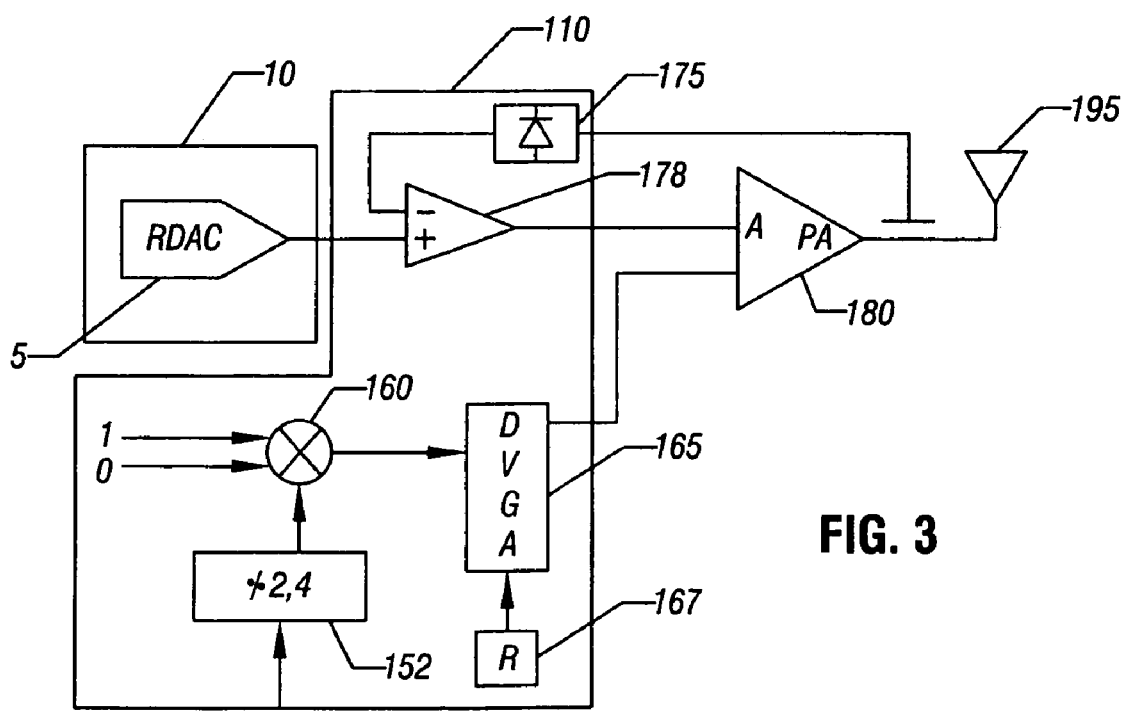
FIG. 3 is a block diagram of a closed loop implementation for a GMSK mode of operation in accordance with an embodiment of the present invention.

Referring now to FIG. 3, shown is a block diagram of a closed loop configuration for a GMSK mode in accordance with an embodiment of the present invention. As shown in FIG. 3, a feedback path is coupled from the output of PA 180 back to transceiver 110. More specifically, the feedback path is coupled through a level detector 175 and is provided to an amplifier 178, where a difference between the detected feedback information and the analog power level signal is amplified. In this implementation, PA 180 is thus controlled based on the output of amplifier 178. In this embodiment, the transmission path is the same as that shown and described with regard to FIG. 2 above.

Figure 4:
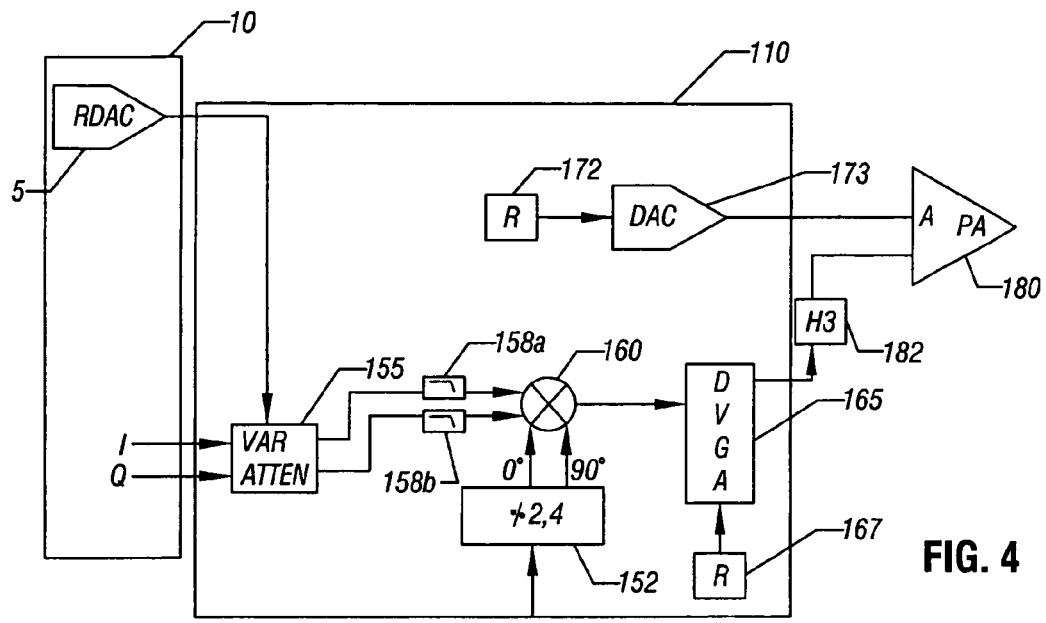
FIG. 4 is a block diagram of an open loop configuration for an 8-PSK mode of operation in accordance with an embodiment of the present invention.

In similar manner, a transceiver in accordance with an embodiment of the present invention may be controlled in either open loop or closed loop fashion for an 8-PSK mode of operation. Referring now to FIG. 4, shown is a block diagram of an open loop configuration for an 8-PSK mode of operation in accordance with an embodiment of the present invention. As shown in FIG. 4, in an 8-PSK mode of operation, incoming I and Q data (i.e., obtained from baseband processor 10) are attenuated in a variable attenuator 155 (which may correspond to AVGA 155 shown in FIG. 1) that is controlled from incoming control signals from baseband processor 10. More specifically, ramp DAC 5 of baseband processor 10 may provide ramp signals to variable attenuator 155. From variable attenuator 155, the attenuated signals may be provided through low pass filters 158a and 158b to mixer 160, where they are mixed with incoming unmodulated (i.e., continuous wave) signals which are at the channel frequency from phase shifter/frequency divider 152. The output from mixer 160 is provided to DVGA 165, which may be controlled via register 167. Note that the output from DVGA 165 may be filtered by a harmonic filter 182, in some implementations. As further shown in FIG. 4, in an open loop configuration a nominal voltage level for the PA may be generated from a nominal level stored in a register 172 that is provided to a DAC 173 that in turn generates an analog voltage to provide for control of PA 180.

Figure 5:
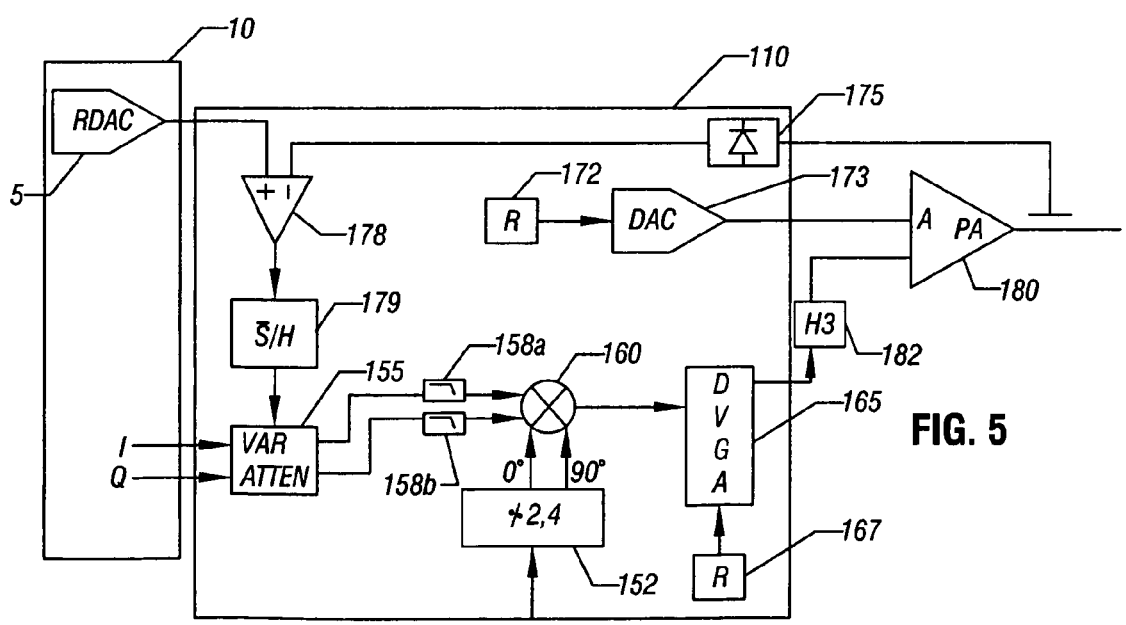
FIG. 5 a block diagram of a closed loop configuration for an 8-PSK mode of operation in accordance with an embodiment of the present invention.

Referring now to FIG. 5, shown is a block diagram of a closed loop configuration for an 8-PSK mode of operation in accordance with an embodiment of the present invention. In a closed loop configuration, a feedback path from the output of PA 180 is coupled through a level detector 175 and provided to an amplifier 178, which amplifies a difference between the detected feedback signal and the output of ramp DAC 5 of baseband processor 10. The output of amplifier 178 is provided to a sample and hold circuit 179, which may be used to disable feedback after ramp up and before ramp down. The output of sample and hold circuit 179 is in turn used to control variable attenuator 155. While shown with these particular implementations of open loop and closed loop configurations in the embodiments of FIGS. 2-5, it is to be understood that the scope of the present invention is not limited to these particular configurations, and other manners of controlling a transceiver in accordance with an embodiment of the present invention may be implemented.

Figure 6:
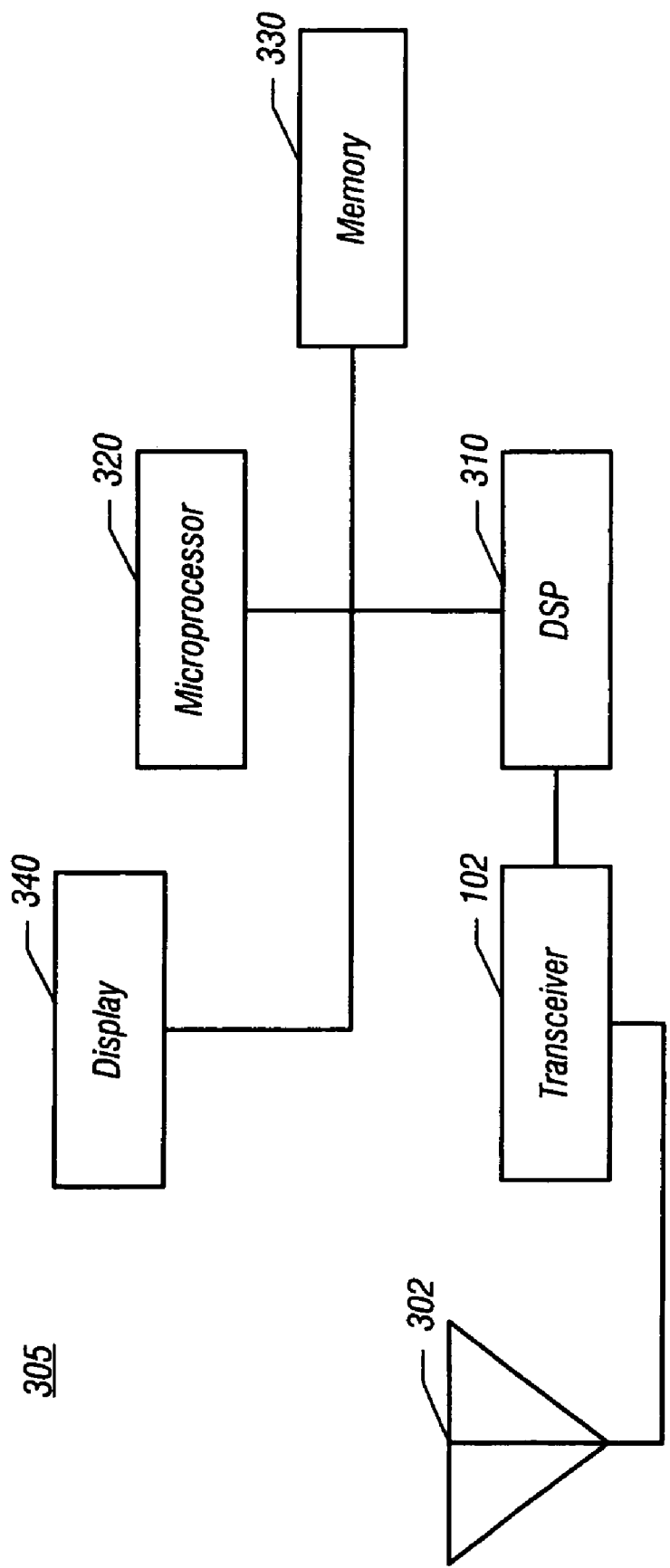
FIG. 6 is a block diagram of a system in accordance with one embodiment of the present invention.

A transceiver in accordance with an embodiment of the present invention can be implemented in many different systems. As one example, referring now to FIG. 6, shown is a block diagram of a system. As shown in FIG. 6, system 305 may be a cellular telephone handset, although the scope of the present invention is not so limited. For example, in other embodiments, the system may be a pager, personal digital assistant (PDA) or other such device. As shown, an antenna 302 may be coupled to a transceiver 102, which may correspond to transceiver 110 of FIG. 1. In turn, transceiver 102 may be coupled to a digital signal processor (DSP) 310, which may handle processing of baseband communication signals. In turn, DSP 310 may be coupled to a microprocessor 320, such as a central processing unit (CPU) that may be used to control operation of system 305 and further handle processing of application programs, such as personal information management (PIM) programs, email programs, downloaded games, and the like. Microprocessor 320 and DSP 310 may also be coupled to a memory 330. Memory 330 may include different memory components, such as a flash memory and a read only memory (ROM), although the scope of the present invention is not so limited. Furthermore, as shown in FIG. 6, a display 340 may be present to provide display of information associated with telephone calls and application programs. Although the description makes reference to specific components of system 305, it is contemplated that numerous modifications and variations of the described and illustrated embodiments may be possible. Furthermore, transceiver 102 and/or DSP 310 may include an article in the form of a machine-readable storage medium (or may be coupled to such an article, e.g., memory 330) onto which there are stored instructions and data that form a software program. The software program may provide for control of transceiver 102, e.g., for controlling transmission of RF signals according to multiple communication protocols along at least several transmission paths, e.g., via control of which transmission path is selected and control of the selected transmission path (e.g., frequency, gain, timing and so forth) and non-selected path (e.g., via input of predetermined values).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first transmission path to receive and process baseband data in a first mode of operation to generate a radio frequency (RF) signal for output via a common output path wherein generation of the RF signal includes, at a mixer, coupling baseband data to one or more mixer slices thereby providing a digital variable gain amplifier;
a second transmission path to receive and process the baseband data in a second mode of operation to generate the RF signal for output via the common output path wherein generation of the RF signal is characterized by coupling, at a mixer, additional mixer slices at a fixed current density; and
a multiplexer arranged to provide the incoming baseband signals to a selected one of the first and second transmission paths in the first and second modes of operation respectively.

2. The apparatus of claim 1, wherein the apparatus is to reuse at least a portion of the first transmission path in the second mode of operation, wherein the first transmission path is to provide an unmodulated carrier signal to the second transmission path in the second mode of operation.

3. The apparatus of claim 1, further comprising a multiplexer to receive the baseband data and to provide the baseband data to the first transmission path in the first mode of operation, and to provide a predetermined value to the second transmission path in the first mode of operation.

4. The apparatus of claim 1, wherein the first transmission path comprises an offset phase lock loop (OPLL) including:
a phase detector coupled to an output of a first mixer, the phase detector further coupled to receive a feedback signal from a second mixer;
a filter coupled to receive and filter an output of the phase detector;
a local oscillator coupled to an output of the filter to output a modulated signal in the first mode of operation, wherein the local oscillator is to output an unmodulated signal in the second mode of operation; and
the second mixer coupled to receive an output of the local oscillator.

5. The apparatus of claim 4, wherein the local oscillator is coupled to provide the modulated signal to a mixer of the second transmission path in the first mode of operation.

6. The apparatus of claim 5, wherein the mixer of the second transmission path is to buffer and provide the modulated signal to the common output path.

7. The apparatus of claim 5, wherein the OPLL is to provide the unmodulated signal to the mixer of the second transmission path in the second mode of operation.

8. The apparatus of claim 7, wherein the mixer of the second transmission path is to mix the baseband data with the unmodulated signal in the second mode of operation.

9. The apparatus of claim 5, wherein the mixer of the second transmission path comprises a commutating mixer having a plurality of circuitry slices individually controllable to control a gain of the RF signal.

10. The apparatus of claim 5, wherein the second transmission path comprises:
an analog amplifier coupled to receive the baseband data; and
a filter coupled between an output of the analog amplifier and the mixer of the second transmission path.

11. The apparatus of claim 10, wherein a gain of the analog amplifier is to be continuously controlled.

12. The apparatus of claim 1, wherein the RF signal includes amplitude and phase information in the second mode of operation.

13. The apparatus of claim 12, wherein the first mode of operation includes a GMSK modulation scheme and the second mode of operation includes an 8-PSK modulation scheme.

14. A system comprising:
a first transmitter path to receive first baseband data and generate a gaussian minimum shift keying (GMSK)

radio frequency (RF) signal in a GMSK mode of operation wherein generating of the GMSK RF signal includes controlling current density of the first baseband data and coupling the first baseband data to at least one of a plurality of mixer slices at a mixer for mixing with a local oscillator signal;

a second transmitter path to receive second baseband data and generate an 8 phase shift keying (8-PSK) RF signal in an 8-PSK mode of operation wherein the received second baseband data is coupled to additional mixer slices at a fixed current density, and wherein the second transmitter path is to buffer the GMSK RF signal in the GMSK mode of operation; and a power amplifier coupled to the second transmitter path.

15. The system of claim 14, wherein the second transmitter path comprises a direct upconversion transmitter.

16. The system of claim 15, further comprising a transceiver including the first transmitter path and the second transmitter path, wherein the transceiver is controllable in an open loop configuration or in a closed loop configuration.

17. The system of claim 16, further comprising a feedback path coupled to receive an output of the power amplifier, the feedback path further comprising a second amplifier to amplify a difference between a value representative of the power amplifier output and a reference signal received from a baseband processor coupled to the transceiver.

18. The system of claim 14, wherein the first transmitter path comprises:

a phase detector coupled to an output of a first mixer, the phase detector further coupled to receive a feedback signal from a second mixer;

a filter coupled to receive and filter an output of the phase detector;

a local oscillator coupled to an output of the filter to output a modulated signal in the GMSK mode of operation, wherein the local oscillator is to output the unmodulated carrier signal in the 8-PSK mode of operation; and the second mixer coupled to the receive an output of the local oscillator.

19. The system of claim 18, wherein the second transmitter path comprises:

an analog amplifier coupled to receive the second baseband data;

a filter coupled to an output of the analog amplifier; and a mixer coupled to an output of the filter to mix the second baseband data with the unmodulated carrier signal from the first transmitter path in the 8-PSK mode of operation.

20. The system of claim 19, wherein a gain of the analog amplifier is to be continuously controlled.

21. The system of claim 20, further comprising a transceiver including the first transmitter path and the second transmitter path, wherein the transceiver is controllable in an open loop configuration or in a closed loop configuration.

22. The system of claim 21, further comprising a feedback path coupled to receive an output of the power amplifier, the feedback path further comprising a second amplifier to amplify a difference between a value representative of the power amplifier output and a reference signal received from a baseband process or coupled to the transceiver, wherein an output of the second amplifier is to control the analog amplifier.

23. A method comprising:

providing first incoming baseband signals to a first transmission path of a transceiver, wherein the first incoming baseband signals are for a first wireless communication protocol, and processing the first incoming baseband signals in an offset phase lock loop (OPLL) of the first transmission path including controlling current density of the first incoming baseband signal by coupling the first incoming baseband signal to at least one of a plurality of mixer slices so as to obtain first radio frequency (RF) signals; and providing second incoming baseband signals to a second transmission path of the transceiver, wherein the second incoming baseband signals are for a second wireless communication protocol, and modulating an unmodulated output signal of the OPLL with the second incoming baseband signals and additional mixer slices at a fixed current density to obtain second RF signals in the second transmission path.

24. The method of claim 23, further comprising buffering the first RF signals in the second transmission path.

25. The method of claim 23, further comprising providing a fixed input to the second transmission path while providing the first incoming baseband signals to the first transmission path.

26. The method of claim 23, further comprising controlling the first transmission path according to an open loop model or a closed loop model based on a system in which the transceiver is located.

* * * * *